Patented Jan. 8, 1946

2,392,585

UNITED STATES PATENT OFFICE 2,392,585

POLYMERIZATION IN AQUEOUS EMULSION

Charles F. Fryling, Silver Lake, Ohio, assignor to The B. F. Goodrich Company, New York, N. Y., a corporation of New York No Drawing. Application February 19, 1941, Serial No. 379,718

4 Claims. (Cl. 260—84.5)

This invention relates to the polymerization of monomers in an aqueous emulsion, and particularly to the polymerization of emulsions comprising conjugated butadienes to form synthetic latices.

The polymerization of unsaturated compounds in aqueous emulsion is well known. Such polymerizations are ordinarily effected in glass or stainless steel vessels. The emulsions must be stirred during the polymerization, both to keep the monomer emulsified in the water and to maintain a constant temperature throughout the emulsion. It has been found that a layer of polymer on the walls of the vessel and on the stirrer often forms during the polymerization. This polymer is sometimes extremely difficult to remove, and cannot ordinarily be used after it is recovered.

I have discovered that the formation of a layer of polymer on the walls of the polymerizer and on the stirrer during the polymerization of unsaturated compounds in aqueous emulsion can be minimized or entirely avoided by including in the emulsion a portion of the previous charge. The product of an emulsion polymerization is ordinarily a dispersion somewhat resembling natural latex. Before the dispersion is stabilized or coagulated, a small amount is removed for inclusion in the next charge. The amount of dispersion employed is not critical. From $\frac{1}{15}$ to $\frac{1}{5}$ by volume of the previous charge is ordinarily sufficient, but greater or less amounts may be used if desired.

As a specific example of the method of this invention, 112 lbs. of butadiene-1,3 and 48 lbs. of methyl methacrylate were copolymerized in emulsion in about 40 gals. of a 2% soap solution in the presence of hydrogen peroxide as a catalyst. The product was a dispersion resembling natural latex, but it was found that several pounds of an extremely sticky polymer had deposited on the walls of the polymerizer and the stirrer and interfered both with the heat transfer and the stirring. After the polymerizer was cleaned, it was again charged as previously, except that about 10 gals. of the dispersion obtained as the product of the previous charge was included in the batch. At the end of the polymerization, the walls of the polymerizer and the stirrer were exceptionally free from adherent polymer.

When polymerization has been effected by the method of this invention and there is insufficient polymer adhering to the polymerizer to require cleaning, it is unnecessary to draw all of the synthetic latex from the polymerizer and then replace part of it. Thus, if another polymerization were to be performed in the above specific example, about 10 gals. of the product of the second polymerization would be left in the polymerizer, and another charge added immediately. If some time is to elapse between the two polymerizations, the dispersion from the previous charge should be protected against deterioration by excluding oxygen, since synthetic latices are ordinarily rather unstable, and the conventional antioxidants cannot be included in dispersions which are to enter into subsequent polymerizations.

Although the method of this invention has been described specifically with reference to the copolymerization of butadiene-1,3 and methyl methacrylate, it may be employed in connection with the polymerization of other unsaturated compounds in aqueous emulsion to yield latex-like dispersions. As an example, may be mentioned the polymerization in aqueous emulsion of conjugated butadienes such as butadiene-1,3, 2,3-dimethylbutadiene-1,3, isoprene, chloroprene, or piperylene either alone or in admixture with each other or with other monomers which are copolymerizable therewith in aqueous emulsion. A number of materials which contain the group $$CH_2=C\diagdown$$

wherein the dangling valences are attached to separate groups and which are believed to enter into polymeric chains only by 1,2-addition are known to be capable of copolymerizing with conjugated butadienes. This class of monomers includes such compounds as styrene, vinyl naphthalene, acrylonitrile, methyl methacrylate, vinyl acetate, vinylidene chloride, methyl vinyl ketone, methyl vinyl ether, and similar unsaturated hydrocarbons, nitriles, esters, halides, ketones, and ethers. The invention is especially valuable in connection with the copolymerization of butadiene-1,3 and acrylic esters such as methyl acrylate, ethyl acrylate, butyl acrylate, methyl methacrylate, ethyl methacrylate, butyl methacrylate, methyl ethacrylate, etc., for such systems exhibit an especially pronounced tendency to form adherent layers on the polymerizer walls.

The invention is applicable to polymerization in the presence of aqueous emulsions formed with the aid of emulsifying agents such as fatty acid soaps including sodium oleate and sodium stearate, hymolal sulfates and sulfonates including sodium lauryl sulfate and sodium isopropyl naphthalene sulfonate, and salts of hymolal organic bases such as the hydrochloride of diethylaminoethyloleylamide, trimethylcetylammonium methyl sulfate, etc.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:

1. In the process of conducting a plurality of successive batch polymerization operations in a single polymerization vessel each of which polymerization operations involves the polymerization of a monomer mixture in an aqueous emulsion containing an emulsifying agent to form a latex-like aqueous dispersion of an elastic rubbery material, said monomer mixture comprising butadiene-1,3 and a smaller amount of another monomer which contains a

group and is copolymerizable therewith in aqueous emulsion, the improvement which consists in effecting each succeeding batch polymerization operation in the presence of an aliquot portion of the dispersion obtained as the product of a preceding batch polymerization operation whereby the formation of a rubbery deposit on the inside surfaces of the polymerization vessel during the successive operations is substantially prevented.

2. The process as defined in claim 1 wherein the monomer mixture consists of butadiene-1,3 and a smaller amount of an alkyl ester of an acrylic acid.

3. The process as defined in claim 1 wherein the monomer mixture consists of butadiene-1,3 and a smaller amount of methyl methacrylate.

4. The process as defined in claim 1 wherein the monomer mixture consists of butadiene-1,3 and a smaller amount of styrene.

CHARLES F. FRYLING.